US006854540B2

(12) United States Patent
McKinnon

(10) Patent No.: US 6,854,540 B2
(45) Date of Patent: Feb. 15, 2005

(54) RAIL TRACK VEHICLE

(76) Inventor: Paul G. McKinnon, 807 West Forest, Brigham City, UT (US) 84302

( * ) Notice: Subject to any disclaimer, the term of this patent is extended or adjusted under 35 U.S.C. 154(b) by 0 days.

(21) Appl. No.: 10/680,457

(22) Filed: Oct. 7, 2003

(65) Prior Publication Data

US 2004/0065487 A1 Apr. 8, 2004

Related U.S. Application Data

(60) Provisional application No. 60/416,823, filed on Oct. 8, 2002.

(51) Int. Cl.[7] .............................................. B62D 55/02
(52) U.S. Cl. ....................................... 180/9.34; 180/9.1
(58) Field of Search ................................ 180/9.1, 9.21, 180/9.28, 9.3, 9.34, 9.36

(56) References Cited

U.S. PATENT DOCUMENTS

| | | |
|---|---|---|
| 3,717,214 A | 2/1973 | Schoonover |
| 3,736,032 A | 5/1973 | Mosshart et al. |
| 3,776,326 A | 12/1973 | Davin et al. |
| 4,519,465 A | 5/1985 | Triplett |
| 4,865,141 A * | 9/1989 | Gey ........................... 180/9.26 |
| 4,950,211 A | 8/1990 | James |
| 5,330,019 A * | 7/1994 | Cartwright ................ 180/9.21 |
| 5,343,960 A | 9/1994 | Gilbert |
| 5,361,860 A | 11/1994 | Smith et al. |
| 5,388,656 A | 2/1995 | Lagasse |
| 5,494,125 A | 2/1996 | Gustin et al. |
| 5,927,413 A | 7/1999 | Miyaki et al. |
| 6,125,956 A | 10/2000 | Gignac |
| 6,179,073 B1 | 1/2001 | Chhabra et al. |
| 6,199,646 B1 | 3/2001 | Tani et al. |
| RE37,174 E * | 5/2001 | Grawey et al. ............ 180/9.21 |
| 6,615,939 B1 * | 9/2003 | Karales et al. ............. 180/9.26 |

* cited by examiner

Primary Examiner—Lesley D. Morris
Assistant Examiner—L. Lum
(74) Attorney, Agent, or Firm—Marcus G. Theodore

(57) ABSTRACT

A track vehicle employing a rail track system attached to the sides of the frame of a track vehicle having a continuous track driven by pneumatic tires mounted to the frame proximate each end of the rail system along such that triangular torsion and compression links are mounted to the continuous track such that the apex end slides along the rail and the other ends extending against the track to provides lighter more even ground contact for use on snow and other soft terrain than present track vehicles.

6 Claims, 9 Drawing Sheets

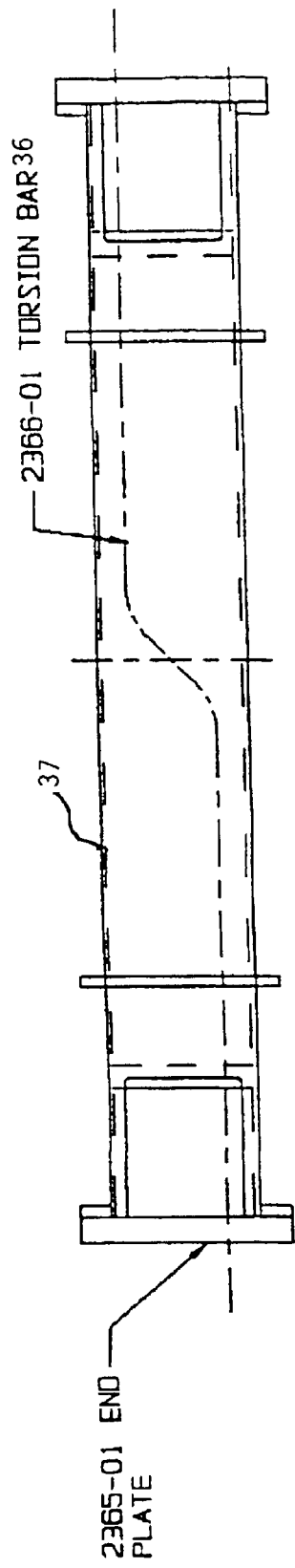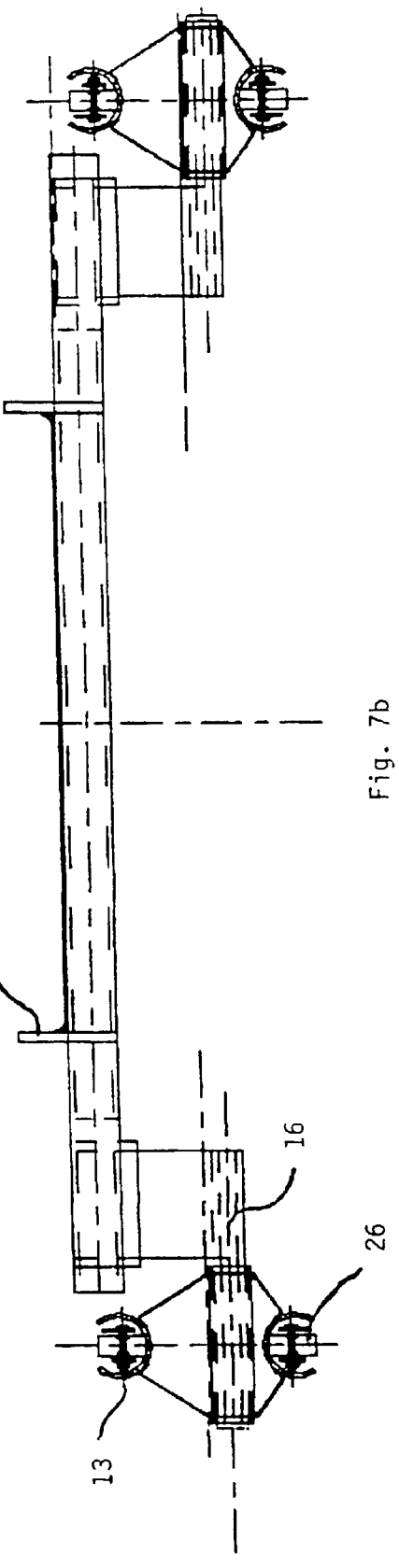
Fig. 7a
Fig. 7b

RAIL TRACK VEHICLE

RELATED APPLICATIONS

The present application is a continuation-in-part application of Provisional Patent Application No. 60/416,823 filed Oct. 8, 2002 entitled "Rail Track Vehicle".

BACKGROUND OF THE INVENTION

1. Field of Invention

The present invention relates to track vehicles. In particular, it relates to a track vehicle employing a rail track system, which provides lighter more even ground contact for use on snow and other soft terrain than present track vehicles.

2. Description of Related Art

Various track vehicles to provide ground propulsion with endless crawler track are known. Tani et al, U.S. Pat. No. 6,199,646B1 discloses a working vehicle with semi-crawler units associated with propelling drive shafts. Each semi crawler unit includes a drive rolling element attachable to one of the propelling drive shafts, an endless crawler track driven by two front and rear and a large central drive rolling elements to contact the ground for vehicle propulsion. These drive rolling elements provide increased pressure point contacts where the track contacts the ground. Chhabra et al, U.S. Pat. No. 6,179,073B1, discloses a hybrid track for a track vehicle incorporating dual tracks each having a plurality of rollers such that the axis of the rollers of each track are in a normal V alignment with those of a corresponding dual track. Gignac, U.S. Pat. No. 6,125,956 discloses a vehicle on tracks driven by toothed wheels mounted to the front and back of each side to drive the tracks, and including two pivoting dual wheel suspension tandems mounted to the middle segments of the frame to uniformly extend the track to contact the ground along four points. Miyaki et al, U.S. Pat. No. 5,927,413 discloses a crawler belt drive apparatus for crawler type vehicles employing a plurality of links, and a link guide such that the links are driven by a drive sprockets associated with a drive shaft at each end of the vehicle; said belt extended to contact the ground via a plurality of rollers attached to the frame and employing link guide muting means to reduce meshing noises and vibrations of the crawler belt. Gustin et al., U.S. Pat. No. 5,494,125 discloses a track supporting roller apparatus employing a plurality of bogie arms and a plurality of track supporting rollers rotatably connected to the bogie arms specifically spaced with respect to track pitch to reduce vibration and shock loads. Lagasse, U.S. Pat. No. 5,388,656 discloses an endless belt traction device for the road wheel of a farm tractor or analogous vehicle employing three wheels about which an endless flexible belt is trained. Gilbert, U.S. Pat. No. 5,343,960 discloses a caterpillar track attachment for a wheeled vehicle having a drive shaft and an hydraulic steering mechanism to convert said vehicle from wheeled drive to continuous track drive. James, U.S. Pat. No. 4,950,211 discloses a track drive sprocket wheel for snow grooming vehicles wherein the sprocket wheel has an enlarged toothed flange providing improved guiding contact with the grousers and utilizing contact with typical non-pneumatic tire guides to increase belt stability and reduce grouser and belt stresses, as well as to increase sprocket wheel durability. Davin et al., U.S. Pat. No. 3,776,326 disclosing an asphalt paving machine mounted on continuous rubber tread tracks mounted around bogie wheels along the sides of the vehicle, and a track tension wheel at one end of the vehicle and a drive sprocket at the other end of the vehicle to drive the tracks. Triplett, U.S. Pat. No. 4,519,465 discloses a variable width extension track type four sprocket wheel drive for crawler tractors using hydraulic pumps and motors for propulsion. Schoonover, U.S. Pat. No. 3,717,214 discloses a tracked vehicle walking beam assembly with equalizing means for ground pressure and track length employing a sprocket-driven, endless track. The equalizing means for equalizing variations in ground pressure and track length has a walking beam pivotally mounted on the shaft with bogey wheels, in between which are backup idler rollers to protect the walking beam when the track passes over obstacles in the area between the bogey wheels. Mosshart et al, U.S. Pat. No. 3,736,032 discloses a pneumatic drive sprocket for tracked vehicles which includes a belted radial tire casing having radially projecting lugs or teeth disposed in spaced-apart relationship about the circumference of the tire and which are adapted to engage the track for driving purposes. Smith et al., U.S. Pat. No. 5,361,860 discloses another continuous belt drive conversion unit for wheel driven tractors.

The present invention described below provides a vehicle with a continuous track system employing a plurality of spaced triangular torsion compression links with an end adapted to run along a track running the length of the vehicle and the other wheel ends adapted to extend the track to provide multiple contact points and uniform extension of the tracks.

SUMMARY OF THE INVENTION

The present invention comprises a track vehicle employing a rail track system attached to its vehicle frame. The rail track system comprises two parallel rails with side structure attached to each side of the vehicle frame. Attached to the vehicle frame proximate both ends of the parallel rails are front and rear torsion bar axles to absorb road shocks. A drive engine mounted to the frame is associated with an hydraulic system which hydraulically drives at least one axle on each side of the vehicle. Mounted to the ends of axles are pairs of pneumatic wheels between which are toothed drive sprockets. Two continuous tracks having a plurality of equally spaced triangular torsion and compression links affixed to their interiors are mounted to surround and be operably associated with the toothed drive sprockets, such that the pneumatic tires run along the interior of the tracks to provide track tension and absorb shocks as the vehicle drives over obstructions. The inner apexes of the triangular torsion and compression links of the tracks are each adapted with a ball bearing end to run along the top of the upper rail and underside of the bottom rail.

The toothed sprockets between the pairs of pneumatic tires preferably have three or four teeth, which are spaced apart and shaped to accommodate and drive the triangular torsion and compression links attached to the tracks. These rail extended triangular torsion and compression links provide even support of the lower segment of the track as the link ball bearing ends slide along the rails.

Preferably, the tops and bottoms of the rails include side support structure to prevent the ball bearing ends of the triangular torsion and compression links from losing contact with the rails in the event the track shifts as the vehicle tilts or inclines. In one preferred embodiment, the top and bottom surfaces of the rails have U shaped side support structure to secure the ball bearing ends in place to slide along the rail. This open ended configuration insures that dust and debris self empty as the ball bearing ends slide along the rails.

A cab is affixed atop the frame and associated with operative controls for a driver to direct the operation of the track vehicle. In one preferred embodiment, needle control valves activated by the operative controls are associated with the hydraulic system to selectively control the flow of hydraulic fluid driving the drive axles to change the rate of rotation of each track such that each track turns differently to turn the track vehicle. A torsion bar suspension system may be mounted between the cab and the frame to cushion the ride.

As the links run along the underside of the rails they provide multiple point equally spaced support of the tracks to provide a more uniform pressure contact as the tracks contact the ground. Combined with the torsion bar suspension system, the pneumatic tires and the link/track rail system, the present invention thus provides cushioned more even support where the tracks contact the ground than do conventional track vehicle systems.

BRIEF DESCRIPTION OF THE DRAWINGS

FIG. 7a is a front view of the torsion bar suspension.

FIG. 7b is a front view of the torsion bar suspension associated with the drive shaft.

DESCRIPTION OF THE ILLUSTRATED EMBODIMENTS

Figure 1:
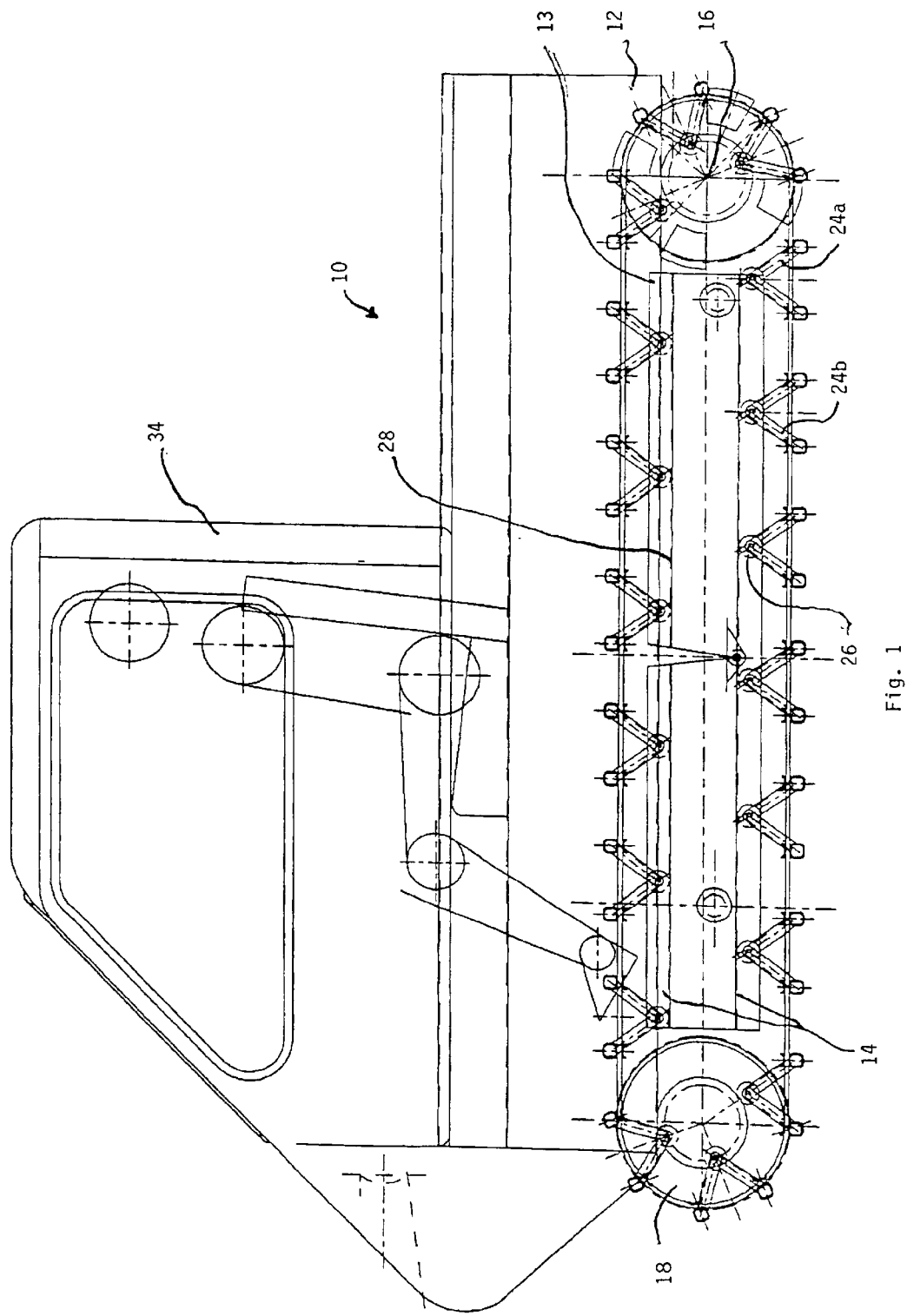
FIG. 1 is a side view of a preferred embodiment of the invention.

FIG. 1 is a side view of a preferred embodiment of the invention 10. The track vehicle frame 12 has two parallel rails 14 with exterior slide guiding structure 13 such as the U shaped trough shown. These rails 14 are attached to each side of the vehicle frame 12 above one another. Attached to the vehicle frame 12 proximate both ends of the parallel rails 14 are front and rear axles 16. A drive engine (not shown) is mounted to the frame 12 and associated with an hydraulic system (not shown) which hydraulically drives at least one axle 16 on each side of the vehicle 10. Mounted to the ends of axles 16 are pairs of pneumatic wheels 18 between which are toothed drive sprockets 20 shown in FIGS. 2 and 4b. Two continuous tracks 22 having a plurality of equally spaced triangular torsion 24a and compression links 24b affixed to their interiors are mounted to surround and be operably associated with the toothed drive sprockets 20, such that the pneumatic wheels 18 run along the interior of the tracks 22 to provide track tension drive and absorb shocks as the vehicle drives over obstructions. The inner apexes 26 of the triangular torsion and compression links 24a, 24b of the tracks 22 are each adapted with ball bearing ends to fit within the slide guiding structure 13 and run along the top 28 and underside 30 of the rails 14. They thus slide there along and are secured to glide along the rails 14 via the slide guiding structure 13. The slide gliding structure 13 also assists in preventing the tracks 22 from disengaging when the vehicle 10 turns or slides laterally.

Figure 2:
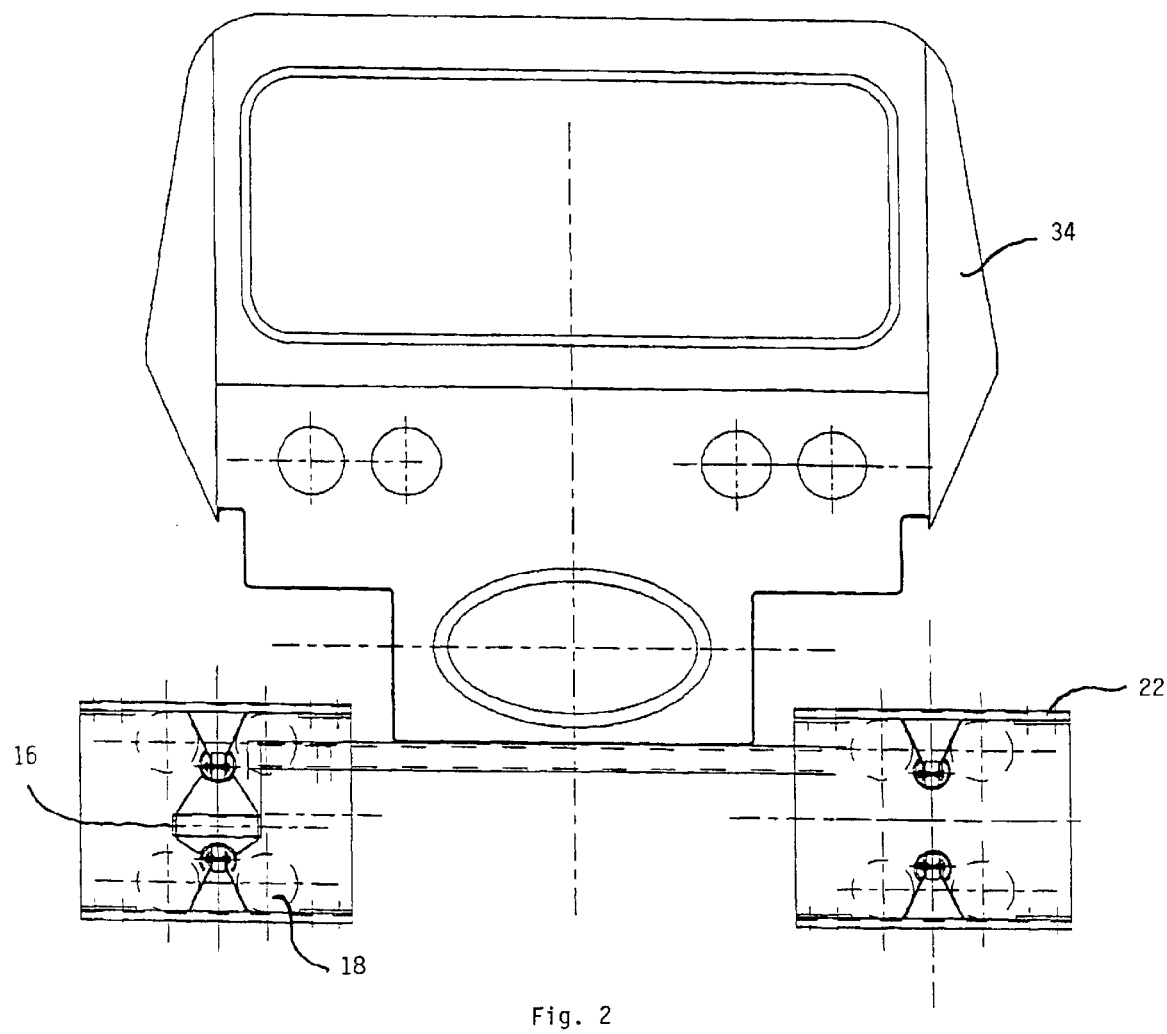
FIG. 2 is a front view of the embodiment of the invention shown in FIG. 1.
Figure 3:
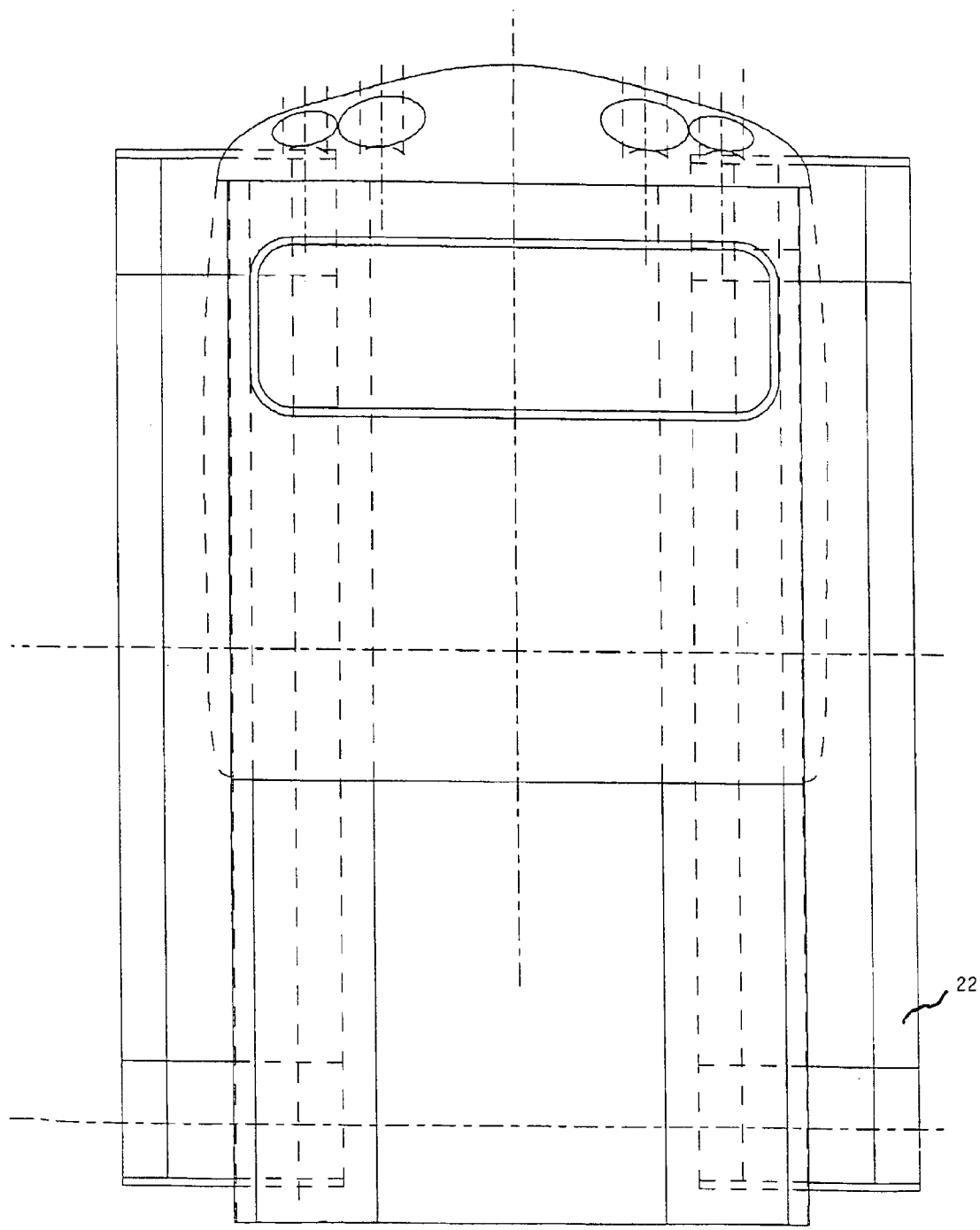
FIG. 3 is a top view of the embodiment of the invention shown in FIGS. 1 and 2.

FIG. 3 is a top view of the preferred embodiment shown in FIGS. 1 and 2.

Figures 4A, 4B:
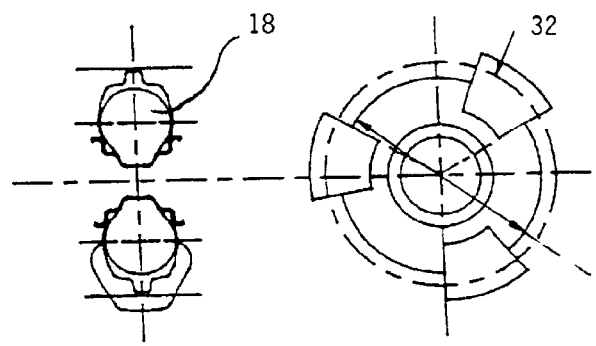
FIG. 4a is cross sectional view of a pneumatic tire used with the three tooth sprocket.
FIG. 4b is a side view of a three tooth sprocket arrangement.
Figure 4C:
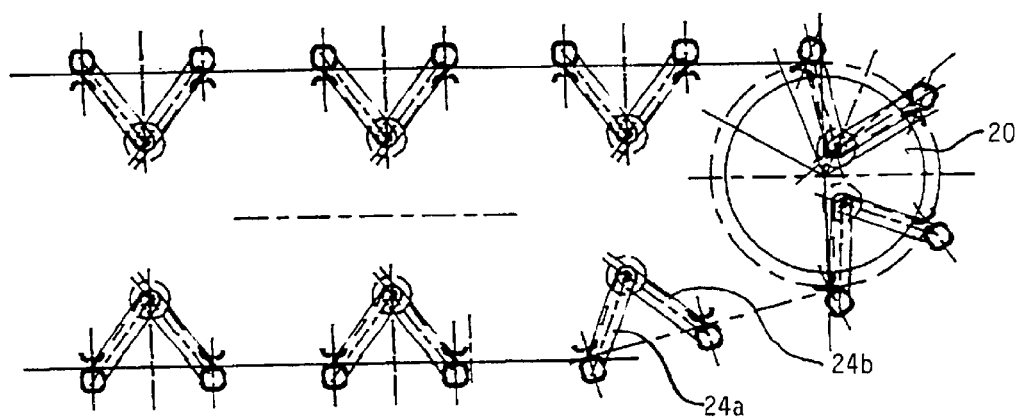
FIG. 4c is a side view of a three tooth sprocket shown interacting with a segment of the track.
Figure 5A:
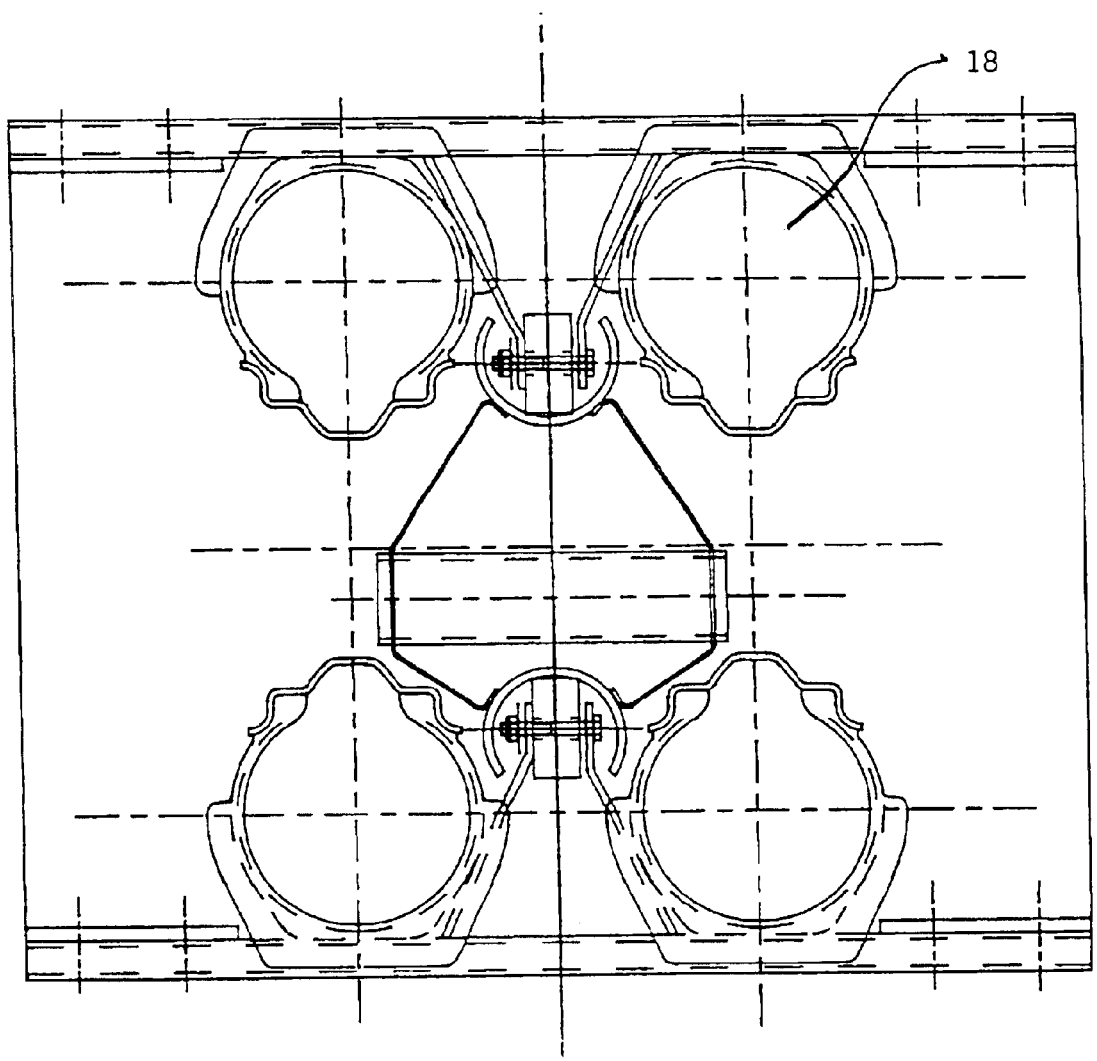
FIG. 5a is a cross sectional view of dual pneumatic tires used with the four tooth sprocket.
Figure 5B:
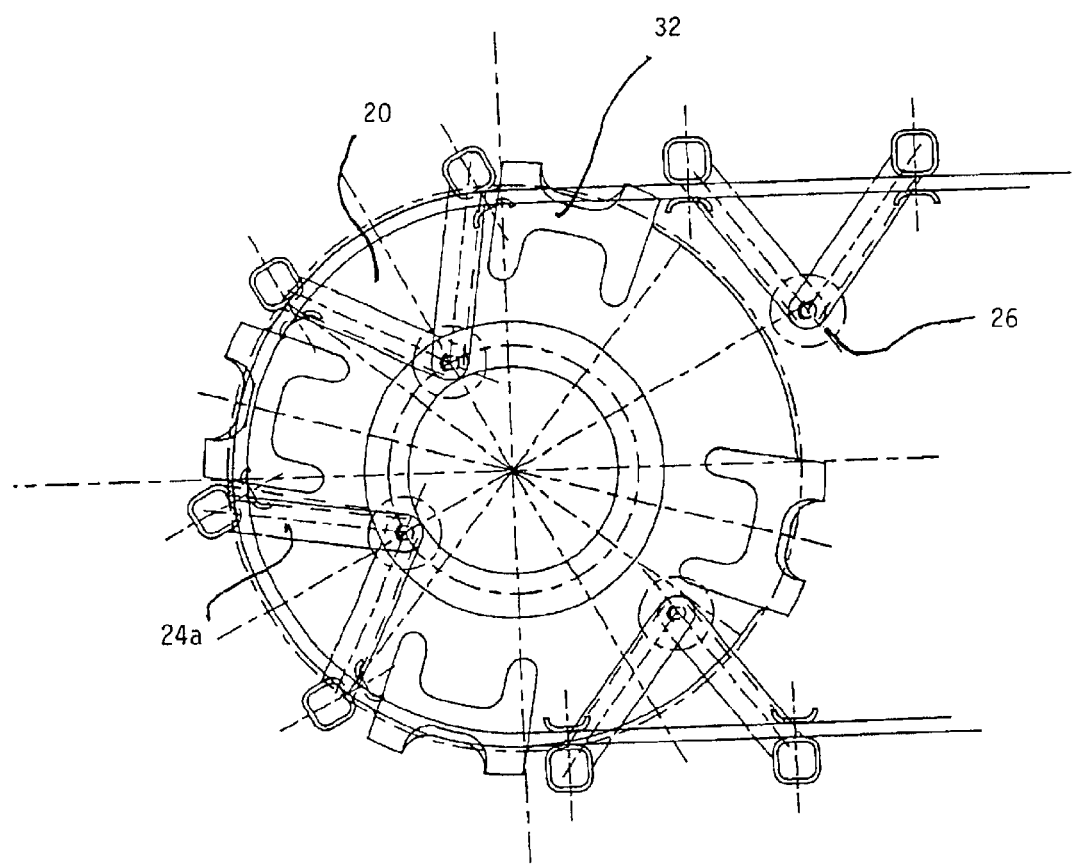
FIG. 5b is a side view of a four tooth sprocket interacting with the links.
Figure 5C:
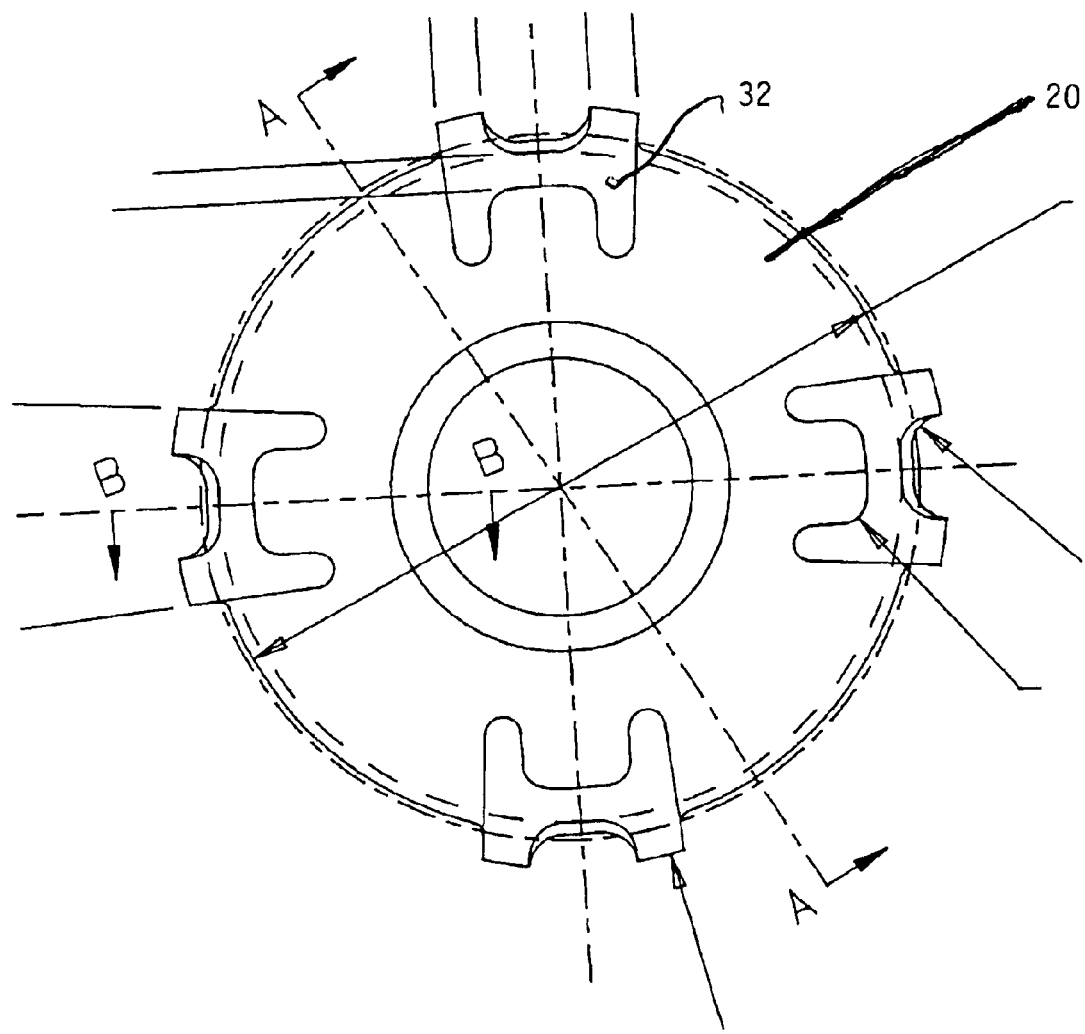
FIG. 5c is a side view of a four tooth sprocket.

The toothed sprockets 20 between the pairs of pneumatic tires 18 preferably have three or four teeth 32 as shown in FIGS. 4a through c and 5a through c, which are spaced apart and shaped to accommodate and drive the triangular torsion 24a and compression 24b links attached to the tracks 22. FIG. 4a is a cross sectional view of a single pneumatic tire used proximate a three tooth sprocket 20 shown in FIG. 4b. FIG. 4c is a side view of a three tooth sprocket 16 interacting with links 24a, 24b. FIG. 5a is a cross sectional view of dual pneumatic tires used to surround the four tooth sprocket 20. FIG. 5b is a side view of a four tooth sprocket interacting with the links 24a, 24b. FIG. 5c is a side view of a four tooth sprocket 16 showing the four teeth 32.

Figure 6:
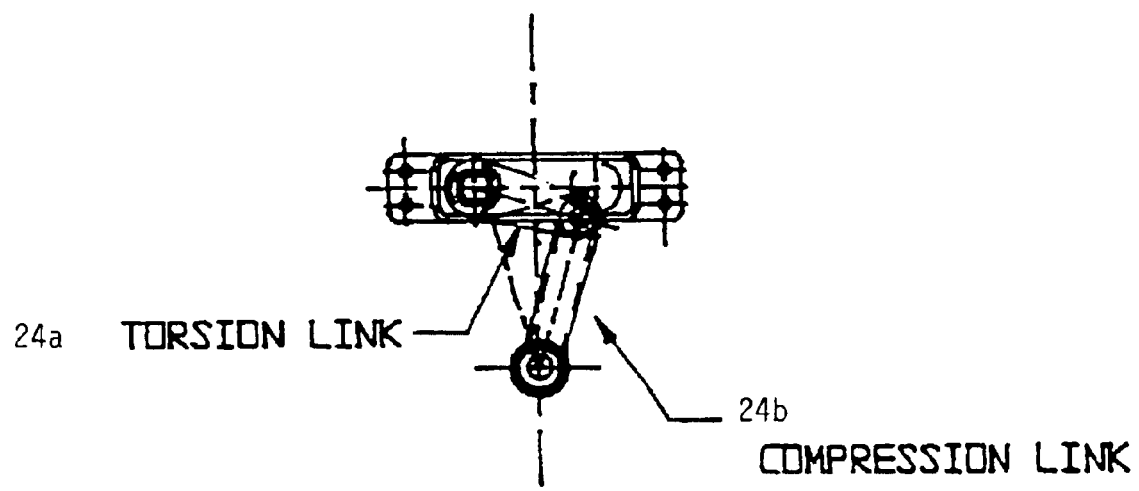
FIG. 6 is side view of the triangular torsion and compression links.

The rail extended triangular torsion 24a and compression 24b links are shown in more detail in FIG. 6 and provide even support of the lower segment of the track as the link ball bearing ends 26 slide along the upper and lower rail surfaces 28, 30.

Preferably, the tops and bottoms of the rails 14 include side support structure 13 to prevent the ball bearing ends 26 of the triangular torsion and compression links 24 from losing contact with the rail surfaces 28, 30 in the event the track 22 shifts as the vehicle 10 tilts or inclines.

A cab 34 is affixed atop the frame 12 and associated with operative controls (not shown for a driver to direct the operation of the track vehicle 10. A torsion bar 36 suspension shown in FIG. 7a within an axle tube 37 is associated with the frame 12 between the cab 34 and drive shaft as shown in FIG. 7b to cushion the ride.

As the apex 26 of the links 24a, 24b run along the underside surface 30 of the rails 14, they provide multiple point equally spaced support of the tracks 22 to provide a more uniform pressure contact as the tracks 22 contact the ground. Combined with the torsion bar suspension system 36, the pneumatic tires 18 and the link/track rail system, the present invention provides cushioned more even support where the tracks 22 contact the ground than do conventional track vehicle systems.

The above description and specification should not be construed as limiting the scope of the invention but as merely providing illustrations of some of the presently preferred embodiments of this invention. Thus, the scope of the invention should be determined by the appended claims and their legal equivalents rather than by the examples given.

I claim:

1. A track vehicle employing a rail track system comprising a vehicle frame, a pair of parallel side rails attached to each side of the frame, drive assemblies comprising a pair of pneumatic tires with drive sprockets therebetween, rotatably attached to the frame via torsion bars proximate each end of the side rails such that the tires extend below the frame, a continuous track comprising torsion and compression links, in which one torsion link and one compression link form an assembly as two sides of a triangle, with an apex that pushes against, and slides along, the side rails, and a pair of track ends affixed to the track, the links being operably associated with the drive sprockets, and surround the tires such that the links pass between the tires while the track is driven, wherein the track ends extend against the track to provide increased ground contact, and, a drive motor attached to the frame, and operably associated with the tires and sprockets to drive the track.

2. A track vehicle according to claim 1, including separate drive motors associated with the tire and drive sprocket assemblies to selectively control a speed of each assembly.

3. A track vehicle according to claim 1, wherein the drive motors are hydraulic and include an hydraulic system activated by a drive engine.

4. A track vehicle according to claim 1, including a transmission assembly associated with tire and drive sprocket assemblies.

5. A track vehicle according to claim 1, wherein the torsion and compression links are equally spaced along the continuous track.

6. A track vehicle according to claim 1, wherein the drive sprockets have equally-spaced teeth to accommodate and drive at least three torsion-and-compression link assemblies at a time.

* * * * *